(12) United States Patent
Good et al.

(10) Patent No.: US 11,142,301 B2
(45) Date of Patent: Oct. 12, 2021

(54) METHODS AND APPARATUS FOR MITIGATING AERODYNAMIC FLUTTER OF AIRCRAFT WING FLAPS

(71) Applicant: The Boeing Company, Chicago, IL (US)

(72) Inventors: Mark S. Good, Seattle, WA (US); Rene T. Nguyen, Edmonds, WA (US); Gregor W. Dempster, Kirkland, WA (US); Bryan J. Gruner, Bellevue, WA (US); Kwan-Ho Bae, Mukilteo, WA (US); Patrick M. Fahey, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 174 days.

(21) Appl. No.: 16/552,472

(22) Filed: Aug. 27, 2019

(65) Prior Publication Data
US 2021/0061446 A1 Mar. 4, 2021

(51) Int. Cl.
*B64C 9/04* (2006.01)
*B64C 13/44* (2006.01)
*B64C 13/16* (2006.01)
*B64D 29/02* (2006.01)

(52) U.S. Cl.
CPC ............... *B64C 13/44* (2013.01); *B64C 9/04* (2013.01); *B64C 13/16* (2013.01); *B64D 29/02* (2013.01)

(58) Field of Classification Search
CPC ............ B64C 9/04; B64C 13/16; B64C 13/44
See application file for complete search history.

(56) References Cited

U.S. PATENT DOCUMENTS

| 4,555,974 | A  | * | 12/1985 | Mason | F15B 18/00 91/363 A |
| 4,605,187 | A  | * | 8/1986 | Stephenson | B64C 9/18 244/216 |
| 9,573,676 | B2 |   | 2/2017 | Dyckrup et al. | |
| 2002/0178825 | A1 | * | 12/2002 | Hickman | B64F 5/60 73/716 |
| 2013/0327887 | A1 | * | 12/2013 | Dyckrup | B64C 13/341 244/99.9 |
| 2016/0290430 | A1 | * | 10/2016 | Socheleau | B64C 13/36 |
| 2017/0335916 | A1 | * | 11/2017 | Fox | B64C 13/40 |
| 2019/0048961 | A1 | * | 2/2019 | Fox | B64C 13/40 |
| 2020/0086973 | A1 | * | 3/2020 | Healy | B64C 9/20 |

FOREIGN PATENT DOCUMENTS

WO 02096751 12/2002

OTHER PUBLICATIONS

European Patent Office, "Search Report," issued in connection with European Patent Application No. 20181879.6, dated Dec. 8, 2020, 8 pages.

* cited by examiner

*Primary Examiner* — Philip J Bonzell
*Assistant Examiner* — Tye William Abell
(74) *Attorney, Agent, or Firm* — Hanley, Flight & Zimmerman, LLC

(57) ABSTRACT

Example methods and apparatus for mitigating aerodynamic flutter of aircraft wing flaps are disclosed. An example apparatus includes a fairing, an actuator, and a damper. The fairing is located on a bottom side of a wing of an aircraft. The actuator is disposed in the fairing. The actuator is coupled to and extends between the wing and a flap of the wing. The damper is disposed in the fairing. The damper is coupled to and extends between the fixed wing and the moveable flap.

25 Claims, 14 Drawing Sheets

METHODS AND APPARATUS FOR MITIGATING AERODYNAMIC FLUTTER OF AIRCRAFT WING FLAPS

FIELD OF THE DISCLOSURE

This disclosure relates generally to aircraft wing flaps and, more particularly, to methods and apparatus for mitigating aerodynamic flutter of aircraft wing flaps.

BACKGROUND

Aircraft commonly employ control surfaces (e.g., high lift devices) along the fixed trailing edge of each wing of the aircraft. For example, each wing of the aircraft may include one or more flap(s) that is/are coupled to the wing, with the flap(s) being movable relative to the fixed trailing edge of the wing. During takeoff and/or landing, the flap(s) may advantageously be moved (e.g., rotated and/or extended) in a downward and/or aft direction relative to the fixed trailing edge of the wing to change the overall shape of the wing, thereby generating more or less lift for the wing and/or the aircraft.

Movement of the flap(s) relative to the fixed trailing edge of the wing commonly occurs via one or more actuation mechanism(s) (e.g., one or more hydromechanical and/or electromechanical actuator(s)) coupled to the flap(s) and to the wing. In some known implementations, the flap(s) of the wing may experience aerodynamic flutter (e.g., vibrations) in response to an operational failure of one or more of the actuation mechanism(s). In the absence of a flutter mitigation mechanism, such aerodynamic flutter may reach undesirable levels, particularly in instances where the wings and/or the flaps of the aircraft are of a relatively thin construction.

SUMMARY

Example methods and apparatus for mitigating aerodynamic flutter of aircraft wing flaps are disclosed herein. In some examples, an apparatus is disclosed. In some disclosed examples, the apparatus comprises a fairing, an actuator, and a damper. In some disclosed examples, the fairing is located on a bottom side of a wing of an aircraft. In some disclosed examples, the actuator is disposed in the fairing. In some disclosed examples, the actuator is coupled to and extends between the wing and a flap of the wing. In some disclosed examples, the damper is disposed in the fairing. In some disclosed examples, the damper is coupled to and extends between the wing and the flap.

In some examples, an aircraft is disclosed. In some disclosed examples, the aircraft comprises a wing, a fairing, an actuator, and a damper. In some disclosed examples, the wing has a fixed portion and a flap. In some disclosed examples, the flap is movable relative to the fixed portion. In some disclosed examples, the fairing is located on a bottom side of the wing. In some disclosed examples, the fairing extends between the fixed portion and the flap. In some disclosed examples, the actuator is disposed in the fairing. In some disclosed examples, the actuator is coupled to and extends between the fixed portion and the flap. In some disclosed examples, the damper is disposed in the fairing. In some disclosed examples, the damper is coupled to and extends between the fixed portion and the flap.

In some examples, a method is disclosed. In some disclosed examples, the method comprises moving a flap of a wing of an aircraft relative to a fixed portion of the wing between a retracted position and a deployed position. In some disclosed examples, the flap is moved via an actuator coupled to and extending between the fixed portion and the flap. In some disclosed examples, the actuator is disposed in a fairing located on a bottom side of the wing and extending between the fixed portion and the flap. In some disclosed examples, the method further comprises damping movement of the flap to mitigate aerodynamic flutter of the flap. In some disclosed examples, the movement of the flap is damped via a damper coupled to and extending between the fixed portion and the flap. In some disclosed examples, the damper is disposed in the fairing.

Figure 1:
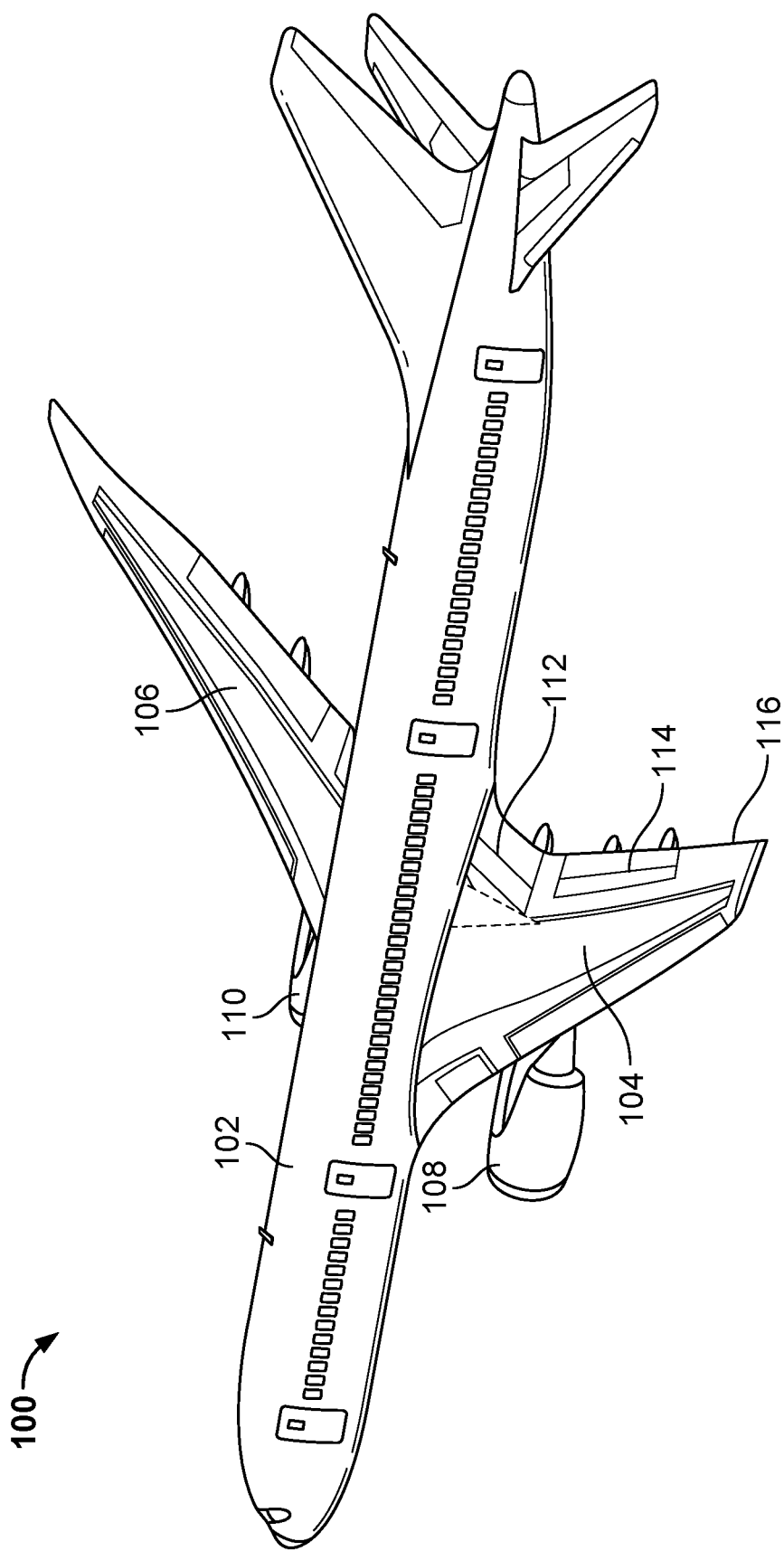
FIG. 1 is a perspective view of an example aircraft in which example methods and apparatus for mitigating aerodynamic flutter of aircraft wing flaps can be implemented in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Aircraft commonly employ control surfaces (e.g., high lift devices) along the fixed trailing edge of each wing of the aircraft. For example, each wing of the aircraft may include one or more flap(s) that is/are coupled to the wing, with the flap(s) being movable relative to the fixed trailing edge of the wing. During takeoff and/or landing, the flap(s) may advantageously be moved (e.g., rotated and/or extended) in a downward and/or aft direction relative to the fixed trailing edge of the wing to change the overall shape of the wing, thereby generating more or less lift for the wing and/or the aircraft.

Movement of the flap(s) relative to the fixed trailing edge of the wing commonly occurs via one or more actuation mechanism(s) (e.g., one or more hydromechanical and/or electromechanical actuator(s)) coupled to the flap(s) and to the wing. In some known implementations, the flap(s) of the wing may experience aerodynamic flutter (e.g., vibrations) in response to an operational failure of one or more of the actuation mechanism(s). In the absence of a flutter mitigation mechanism, such aerodynamic flutter may reach undesirable levels, particularly in instances where the wings and/or the flaps of the aircraft are of a relatively thin construction.

Known flutter mitigation techniques include constructing the flap with a higher gauge material to increase the stiffness of the flap. Constructing the flap with a higher gauge material requires that higher gauge materials be used for constructing the skin and spar components, thereby disadvantageously increasing the cost and weight of the aircraft. Other known flutter mitigation techniques include shortening the spanwise and/or chordwise dimensions of the flap, which may provide for a flap that is more rigid. Shortening the spanwise and/or chordwise dimensions of the flap, however, can disadvantageously impact the aerodynamic effects provided by the flap, and may reduce the aircraft's high-speed and/or low-speed performance capabilities. For example, shortening the spanwise and/or chordwise dimensions of the flap can cause increased drag and, thus, reduce the aircraft's fuel efficiency in cruise conditions, thereby increasing the cost of operating the aircraft. Shortening the spanwise and/or chordwise dimensions of the flap can also reduce the lift capability of the aircraft during takeoff and landing. As such, the aircraft may require a longer runway to takeoff, or higher approach speeds during landing, both of which increase the cost of operating the aircraft.

Example methods and apparatus for mitigating aerodynamic flutter of aircraft wing flaps are disclosed herein. Unlike the known flutter mitigation techniques described above, the example methods and apparatus disclosed herein mitigate aerodynamic flutter of aircraft wing flaps based on one or more damper(s). More specifically, example methods and apparatus disclosed herein implement and/or include a fairing, an actuator, and a damper. In some examples, the fairing is located on a bottom side of a wing of an aircraft. In some examples, the actuator is disposed in the fairing. In some examples, the actuator is coupled to and extends between the wing and a flap of the wing, with the actuator being configured to move the flap between a retracted position and a deployed position relative to a fixed trailing edge of the wing. In some examples, the damper is disposed in the fairing. In some examples, the damper is coupled to and extends between the wing and the flap, with the damper being configured to damp movement of the flap to mitigate aerodynamic flutter of the flap. In some examples, the damper is configured to mitigate aerodynamic flutter of the flap in response to a failure of the actuator.

In some examples, the damper of the example methods and apparatus disclosed herein includes a piston rod having a first end and a second end located opposite the first end, with the first end being coupled to the wing and the second end being coupled to the flap. In some examples, the first end of the piston rod is coupled to the wing proximate a fixed portion of the actuator, and the second end of the piston rod is coupled to the flap proximate a movable portion of the actuator. In some examples, the damper includes a cylinder having a first chamber and a second chamber, and the piston rod includes a first portion positioned within the first chamber on a first side of a rod head of the piston rod, and a second portion positioned within the second chamber on a second side of the rod head located opposite the first side of the rod head. To damp movement of the flap, the rod head moves along a longitudinal axis of the cylinder to provide a damping force to the flap. In some examples, the damper is configured to move along the longitudinal axis based on a pressurized hydraulic fluid that is supplied to the damper. For example, the damper includes an orifice that is configured to receive a pressurized hydraulic fluid. In some examples, the damper is configured to produce a damping force having a magnitude that is based on a size of the orifice.

In some examples, a filter valve is coupled to a hydraulic system of the aircraft to provide pressurized hydraulic fluid to the damper. An example pressure transducer can be included to monitor hydraulic fluid pressures of the damper. In some examples, the damper is configured to be in a passive mode when the actuator is moving the flap, and is further configured to be in an active mode in response to a failure of the actuator. For example, when the actuator fails, a flap may provide a threshold force activating the damper. In some examples, a load relief valve is configured to relieve pressure from the damper. For example, when hydraulic pressure within the cylinder of the damper is above a threshold level, the load relief valve may redirect hydraulic fluid from one or more chambers of the damper. In some examples, an anti-cavitation valve is configured to mitigate cavitation while the pressurized hydraulic fluid is being supplied to the damper. For example, the anti-cavitation valve may mitigate excessive noise and/or vibration resulting from supplying the damper with the hydraulic fluid. In some examples, the anti-cavitation valve maintains fluid pressure in the damper.

Examples disclosed herein reduce cost, complexity, and weight associated with known flutter mitigation techniques, and are particularly advantageous for implementations in which the wings and/or the flaps of the aircraft are of a relatively thin construction. Examples disclosed herein avoid the need to increase the thickness of the wing and flap, thereby mitigating negative impacts on aircraft performance. Examples disclosed herein avoid the need to segment the trailing edge flap, thereby mitigating adding more weight (e.g., more flaps, more fairings, etc.) to the aircraft and reducing costs. Examples disclosed herein also avoid adding additional flap supports and actuators, thereby mitigating over constraining the motion of the flap to avoid high loads at the middle support of the wing. Additionally, the examples disclosed herein do not rigidly resist motion, thereby providing sufficient force to resist oscillating motion of the flap and reduce aerodynamic flutter.

FIG. 1 is a perspective view of an example aircraft 100 in which example methods and apparatus for mitigating aerodynamic flutter of aircraft wing flaps can be implemented in accordance with the teachings of this disclosure. In the illustrated example of FIG. 1, the aircraft 100 includes an example fuselage 102, a first example wing 104 coupled to the fuselage 102, and a second example wing 106 coupled to the fuselage 102. The aircraft 100 also includes a first example engine 108 coupled to the first wing 104, and a second example engine 110 coupled to the second wing 106. In other examples, the aircraft 100 may include multiple engines coupled to each of the first and second wings 104, 106, and/or disposed in other locations on the aircraft 100 (e.g., coupled to the fuselage 102, coupled to a tail section of the aircraft 100, etc.).

Each of the first and second wings 104, 106 of FIG. 1 includes one or more control surface(s) (e.g., one or more high-lift device(s)) located along the respective fixed trailing edges of the first and second wings 104, 106. Such control surface(s) may be moved (e.g., rotated and/or extended) relative to the respective fixed trailing edges of the first and second wings 104, 106 to change the aerodynamic lift of the first and second wings 104, 106 and/or, more generally, of the aircraft 100. In the illustrated example of FIG. 1, the first wing 104 includes a first example flap 112 (e.g., an inboard flap) and a second example flap 114 (e.g., an outboard flap), with each of the first and second flaps 112, 114 being disposed along an example fixed trailing edge 116 of the first wing 104. The first and second flaps 112, 114 may be moved (e.g., rotated and/or extended) downward and/or aft relative to the fixed trailing edge 116 of the first wing 104 to change the shape of the first wing 104, which may be advantageous during takeoff and/or landing of the aircraft 100. In the illustrated example of FIG. 1, the second wing 106 similarly includes one or more flap(s) constructed and/or operated in a manner mirroring that described above in connection with the first and second flaps 112, 114 of the first wing 104. It is understood that any disclosure relating to the first wing 104 can likewise be applied to the second wing 106. Thus, to avoid redundancy, a description of the second wing 106 is not provided herein.

Figure 2:
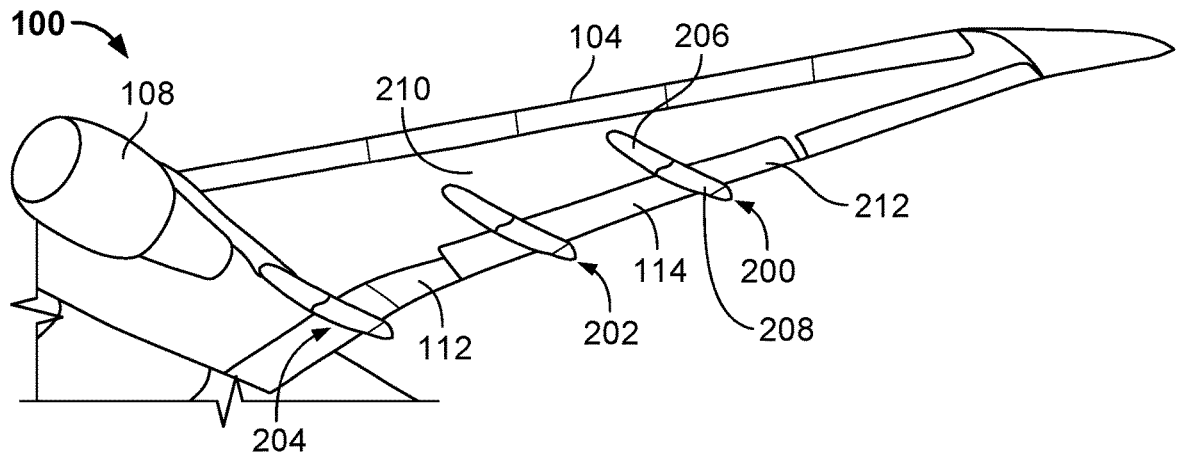
FIG. 2 is a first perspective view of the first example wing of FIG. 1 illustrating the first and second example flaps of the first wing in a stowed position.
Figure 3:
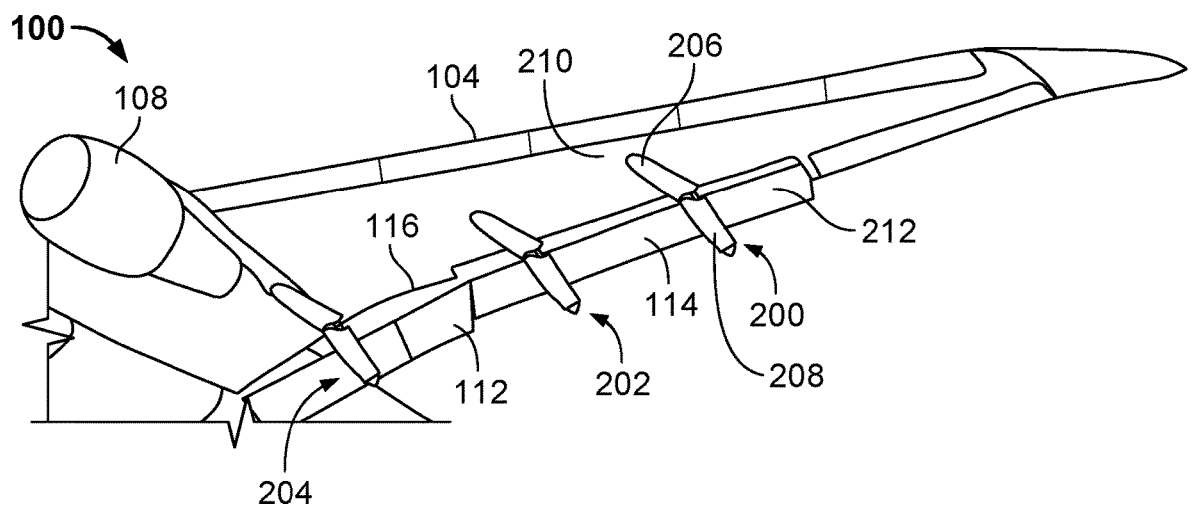
FIG. 3 is a second perspective view of the first example wing of FIGS. 1 and 2 illustrating the first and second example flaps of the first wing in a deployed position.

FIG. 2 is a first perspective view of the first example wing 104 of FIG. 1 illustrating the first and second flaps 112, 114 of the first wing 104 in a stowed position. During cruise, for example, the first and second flaps 112, 114 are stowed in this position, which is generally more aerodynamic and fuel efficient. FIG. 3 is a second perspective view of the first example wing 104 of FIGS. 1 and 2 illustrating the first and second flaps 112, 114 of the first wing 104 in a deployed position, which is commonly used during takeoff and landing to increase the chord length of the first wing 104 to generate more lift.

To help support the first and second flaps 112, 114, the aircraft 100 may include a plurality of flap supports, which are covered by flap support fairings. In the illustrated example of FIGS. 2 and 3, the first wing 104 includes three flap supports (one of which is shown in further detail in connection with FIGS. 4-9) covered by three flap support fairings: a first flap support fairing 200, a second flap support fairing 202, and a third flap support fairing 204. However, any number of flap support fairings may be used (e.g., two flap support fairings on the inboard flap, two flap support fairings on the outboard flap). The third flap support fairing 204 (and the flap support therein) is associated with the first flap 112 and the first and second flap support fairings 200, 202 (and the respective flap supports therein) are associated with the second flap 114. However, in other examples, the first and second flaps 112, 114 may include more or fewer flap supports (with flap support fairings) and/or the flap supports (and flap support fairings) may be disposed in other locations.

The first flap support fairing 200 is moveable downward with the second flap 114 as shown between the positions in FIGS. 2 and 3. In particular, in the illustrated example, the first flap support fairing 200 includes a first section 206 (e.g., a fixed section or wing-side section) that covers a fixed side support of the flap support and a second section 208 (e.g., a movable section or flap-side section) that covers a moveable side support of the flap support. The first and second sections 206, 208 may be considered separate flap support fairings that form an overall flap support fairing that covers the flap support therein. In the illustrated example, the first section 206 of the first flap support fairing 200 is coupled to a bottom side 210 (e.g., a bottom surface) of the first wing 104 and the second section 208 of the first flap support fairing 200 is coupled to a bottom side 212 of the second flap 114. In FIG. 2, the second section 208 of the first flap support fairing 200 is in an up or static position (e.g., a cruise position). As the second flap 114 is moved downward (FIG. 3), the second section 208 of the flap support fairing 200 is moved downward with the second flap 114 relative to the trailing edge 116 of the first wing 104. In the illustrated example of FIGS. 2 and 3, the second and third flap support fairings 202, 204 are substantially the same as the first flap support fairing 200.

Figure 4:
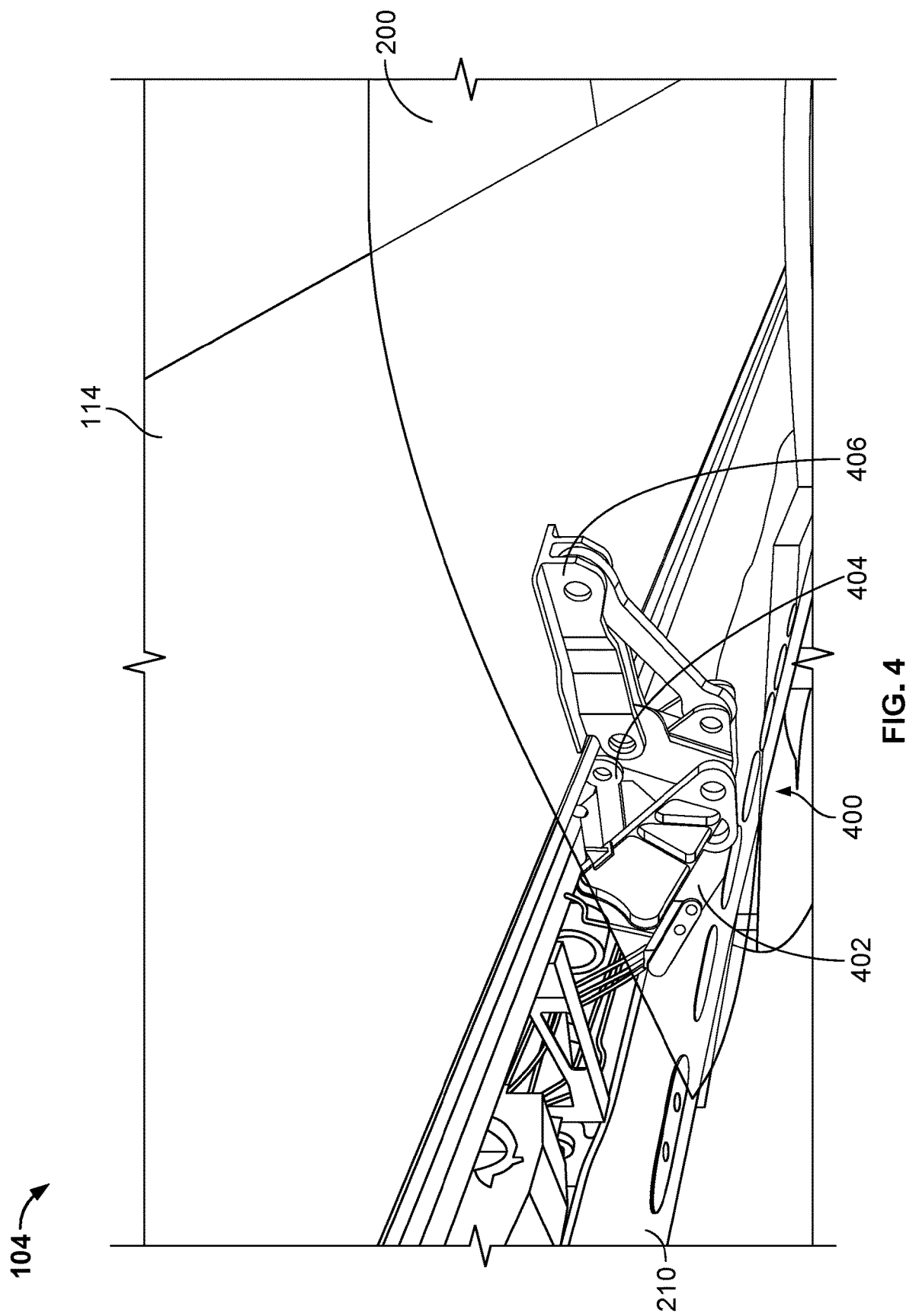
FIG. 4 is a third perspective view of the first example wing of FIGS. 1-3, with the first example flap support fairing of FIGS. 2 and 3 shown in phantom.

FIG. 4 is a third perspective view of the first example wing 104 of FIGS. 1-3, with the first example flap support fairing 200 of FIGS. 2 and 3 shown in phantom. In the illustrated example of FIG. 4, the second flap 114 is moveable between the stowed position (as shown in FIG. 2) and a deployed position (FIG. 3) via a flap actuation system 400. In the illustrated example, the flap actuation system 400 includes an actuator support bracket 402 (e.g., for a geared rotary actuator (GRA)) that moves a flap link arm 404 coupled to a moveable side support 406 and, thus, to the second flap 114. When actuated, the flap link arm 404 rotates the moveable side support 406 downward, thereby moving the second flap 114 outward and downward from the trailing edge 116 of the first wing 104, which causes the first flap support fairing 200 to move downward with the second flap 114. In other examples, the flap actuation system 400 may include more links or drive devices to move the second flap 114 between the stowed and extended positions. The first flap support fairing 200 may be used to cover the flap actuation system 400 and/or any other flap actuation system part(s) to reduce drag and, thus, increase fuel efficiency of the aircraft.

Figure 5:
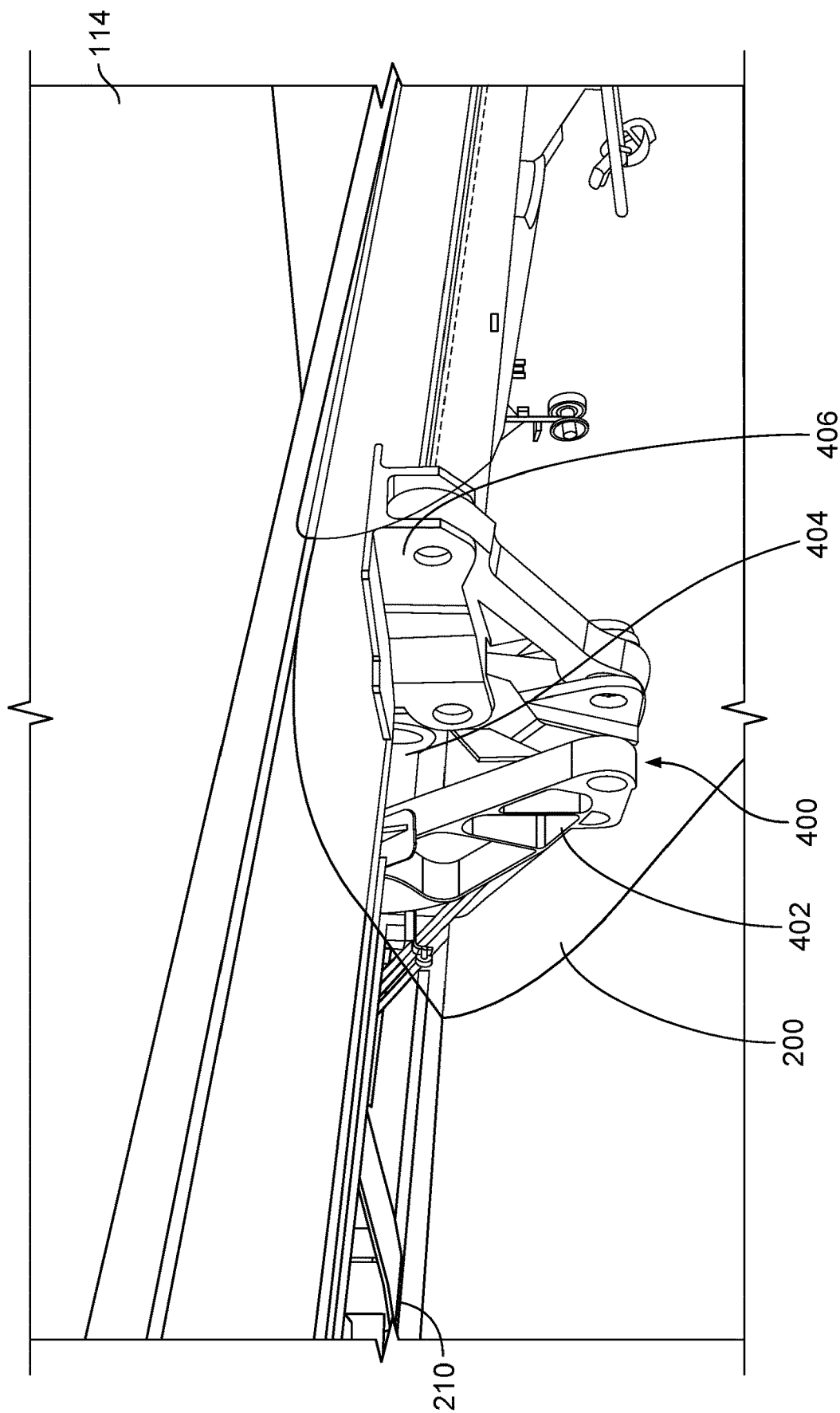
FIG. 5 is a fourth perspective view of the first example wing of FIGS. 1-4, with the first example flap support fairing of FIGS. 2-4 shown in phantom.

FIG. 5 is a fourth perspective view of the first example wing 104 of FIGS. 1-4, with the first example flap support fairing 200 of FIGS. 2-4 shown in phantom.

Figure 6:
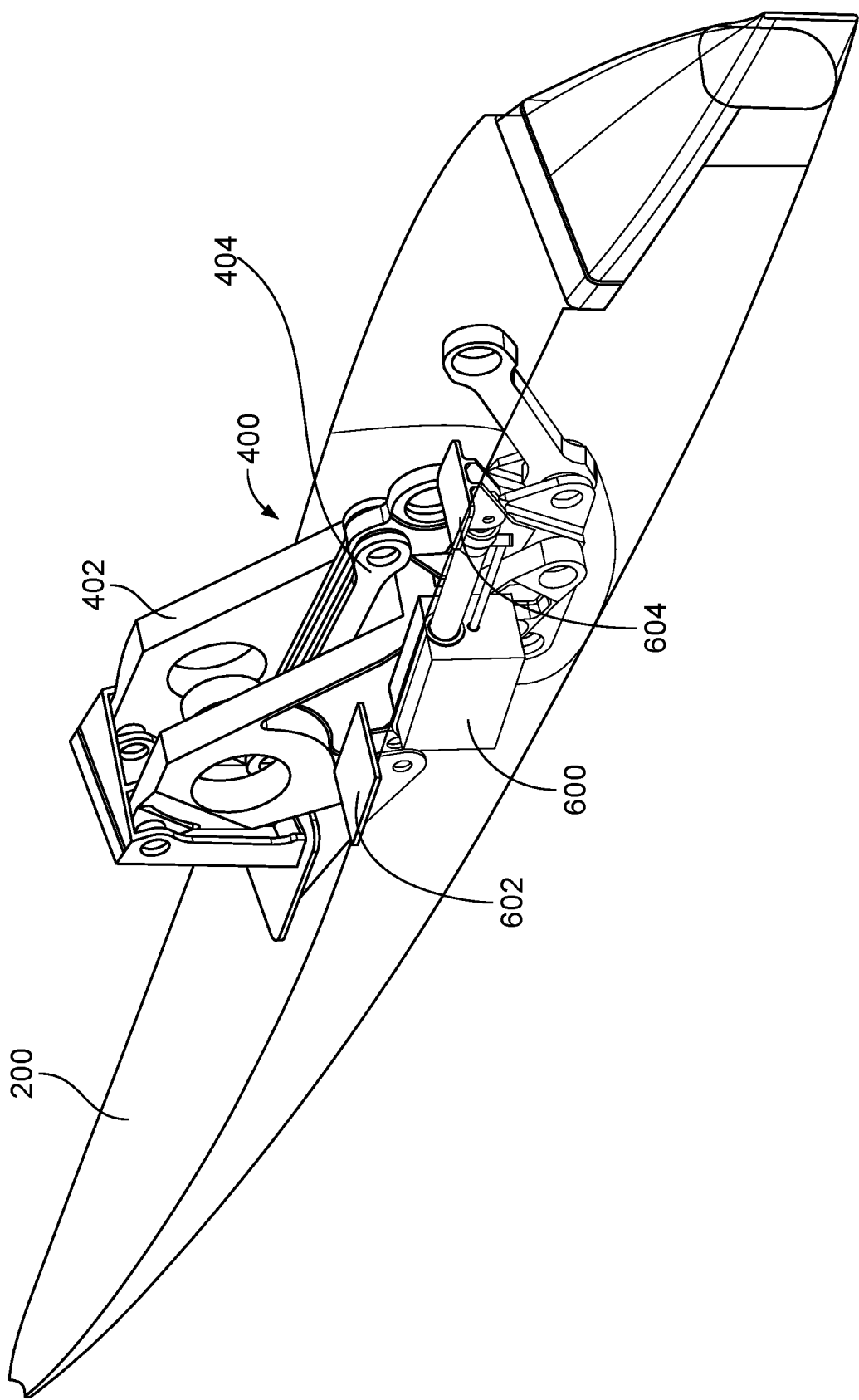
FIG. 6 is a perspective view of an example damper disposed in the first example flap support fairing of FIGS. 2-5.

FIG. 6 is a perspective view of an example damper 600 disposed in the first example flap support fairing 200 of FIGS. 2-5. In the illustrated example, the damper 600 includes a first side support 602 and a second side support 604. In some examples, the first side support 602 is coupled to a fixed wing portion (e.g., the bottom side 210), and the second side support 604 is coupled to the second flap 114. However, the damper 600 may be coupled to any of the flaps 112, 114 and/or any other movable portion of the aircraft 100. In the illustrated example, the damper 600 is disposed in the flap support fairing 200 proximate the flap actuation system 400. In the illustrated example, one example damper 600 is illustrated on a first side of the flap actuation system 400. However, another damper 600 may be disposed in the flap support fairing 200 on a second side of the flap actuation system 400. That is, any number of dampers 600 may be disposed in the flap support fairing 200 and/or outside of the flap support fairing 200 along the first wing 104 of the aircraft 100.

During operation, the flap link arm 404 rotates the moveable side support 406 downward, thereby moving the second flap 114 outward and downward from the trailing edge 116 of the first wing 104. During cruise (e.g., when the aircraft 100 is in flight), the flap link arm 404 rotates the movable side support 406 upward, thereby moving the second flap 114 inward and upward from the trailing edge 116 of the first wing 104 into a retracted (e.g., a stowed) position. In some examples, the flap link arm 404 may be unable to maintain a load on the second flap 114, thereby exposing the second flap 114 to aerodynamic flutter. To mitigate aerodynamic flutter when the flap link arm 404 is unable to maintain a load on the second flap 114, the damper 600 engages the second flap 114 to maintain the load on the second flap 114, as discussed in more detail below.

Figure 7:
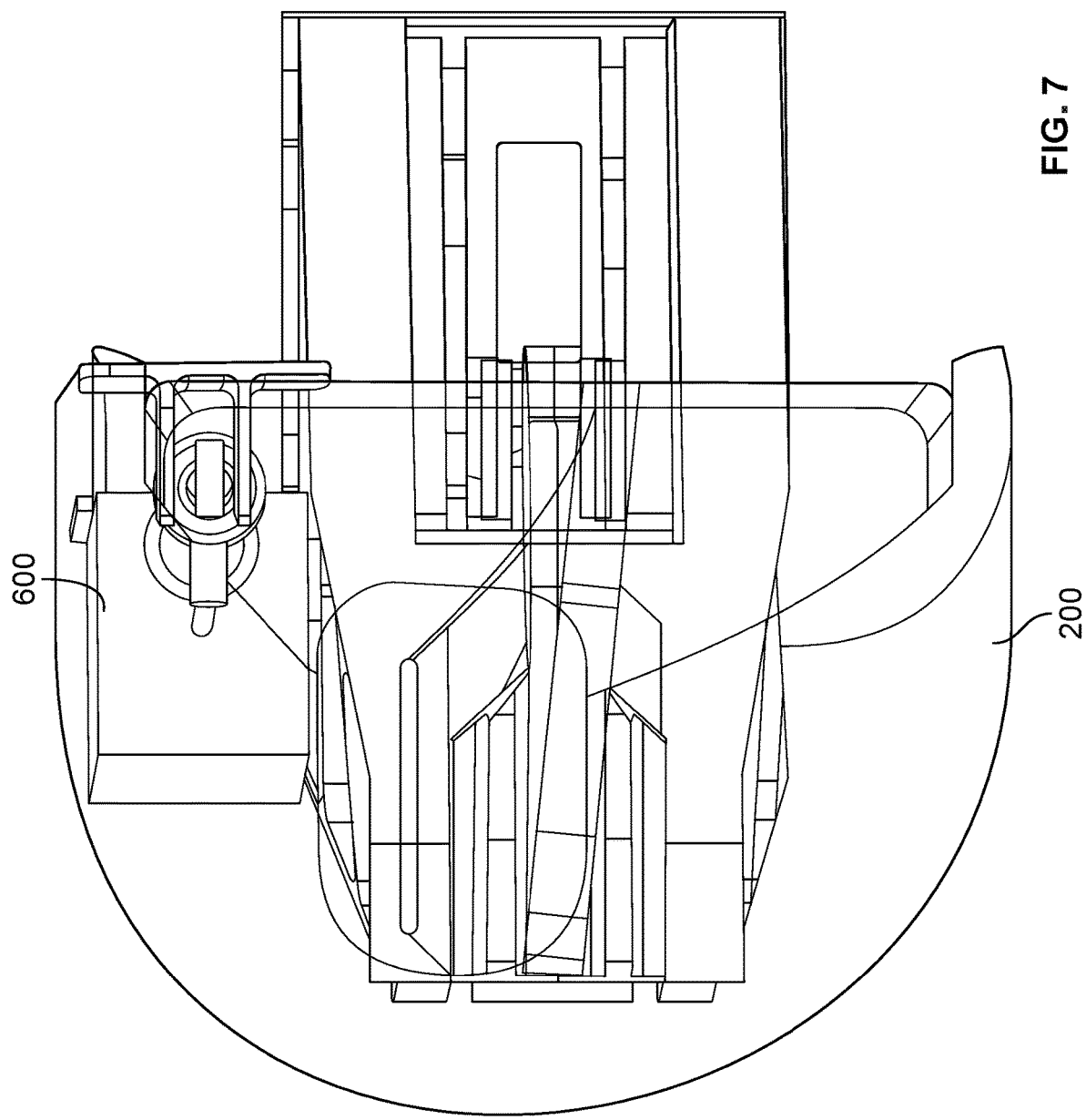
FIG. 7 is a rear view of the example damper of FIG. 6 disposed in the first example flap support fairing of FIGS. 2-6.

FIG. 7 is a rear view of the example damper 600 of FIG. 6 disposed in the first example flap support fairing 200 of FIGS. 2-6.

Figure 8:
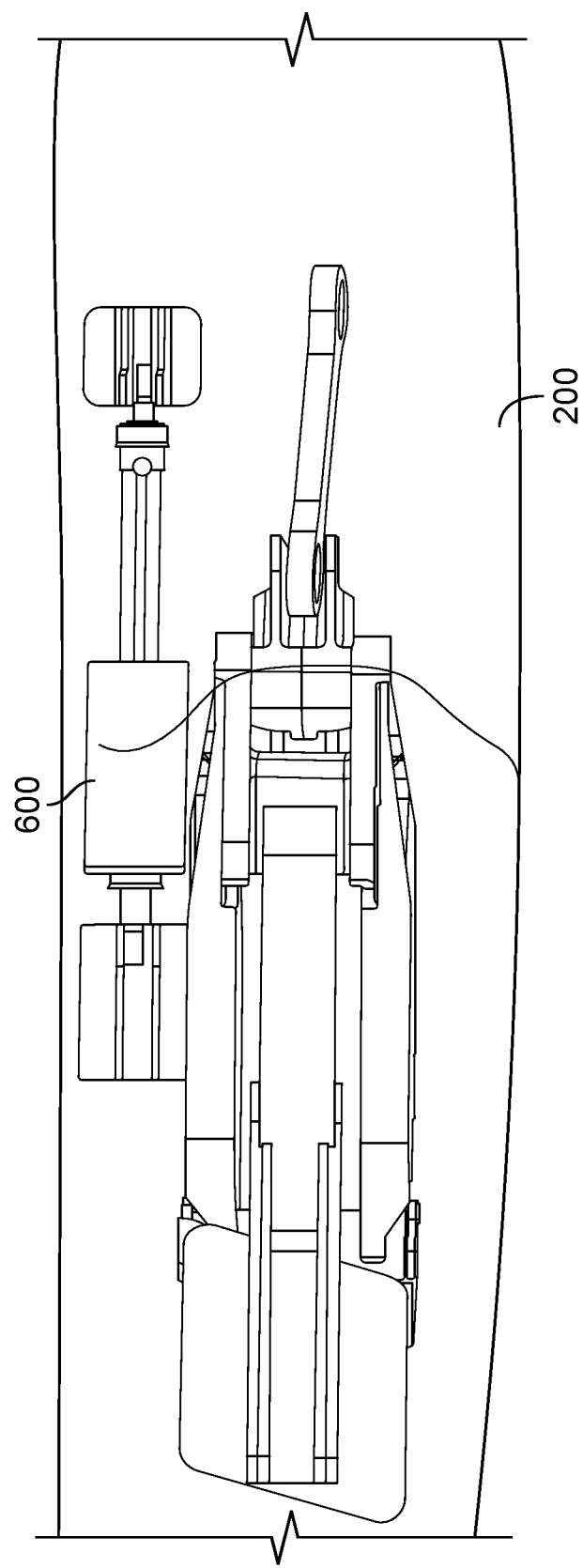
FIG. 8 is a bottom view of the example damper of FIGS. 6 and 7 disposed in the first example flap support fairing of FIGS. 2-7.

FIG. 8 is a bottom view of the example damper 600 of FIGS. 6 and 7 disposed in the first example flap support fairing 200 of FIGS. 2-7.

Figure 9:
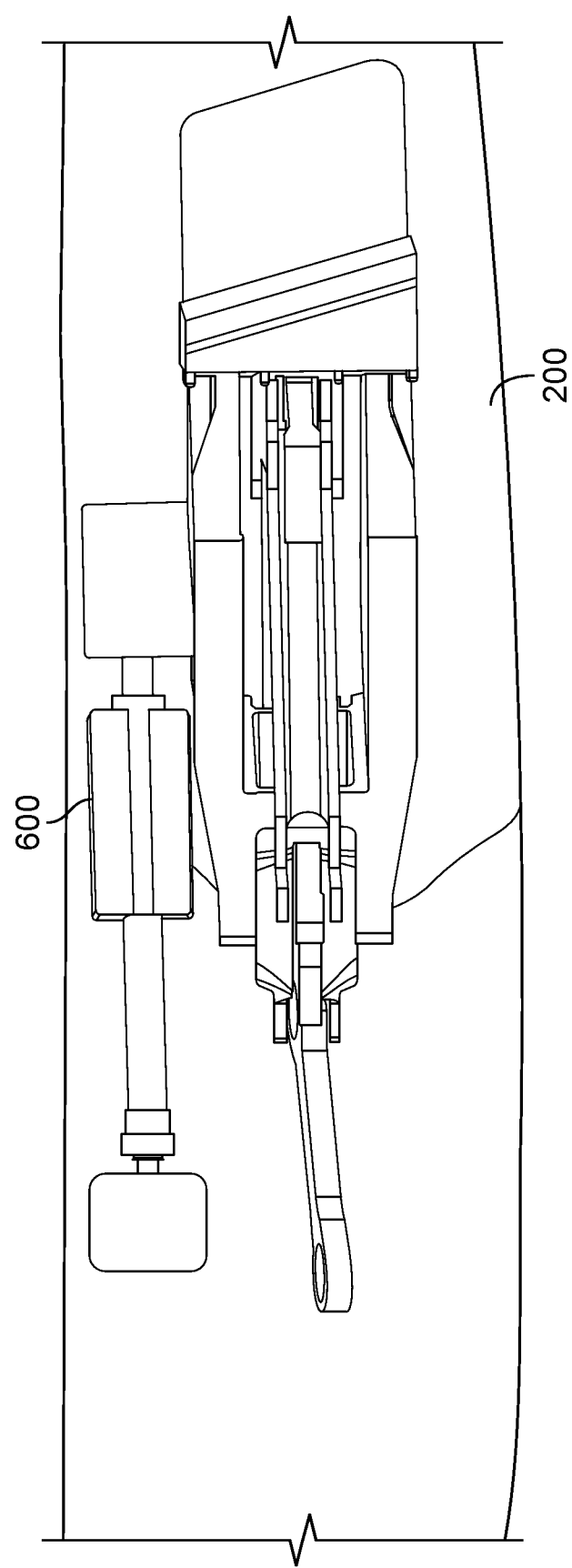
FIG. 9 is a top view of the example damper of FIGS. 6-8 disposed in the first example flap support fairing of FIGS. 2-8.

FIG. 9 is a top view of the example damper 600 of FIGS. 6-8 disposed in the first example flap support fairing 200 of FIGS. 2-8.

Figure 10:
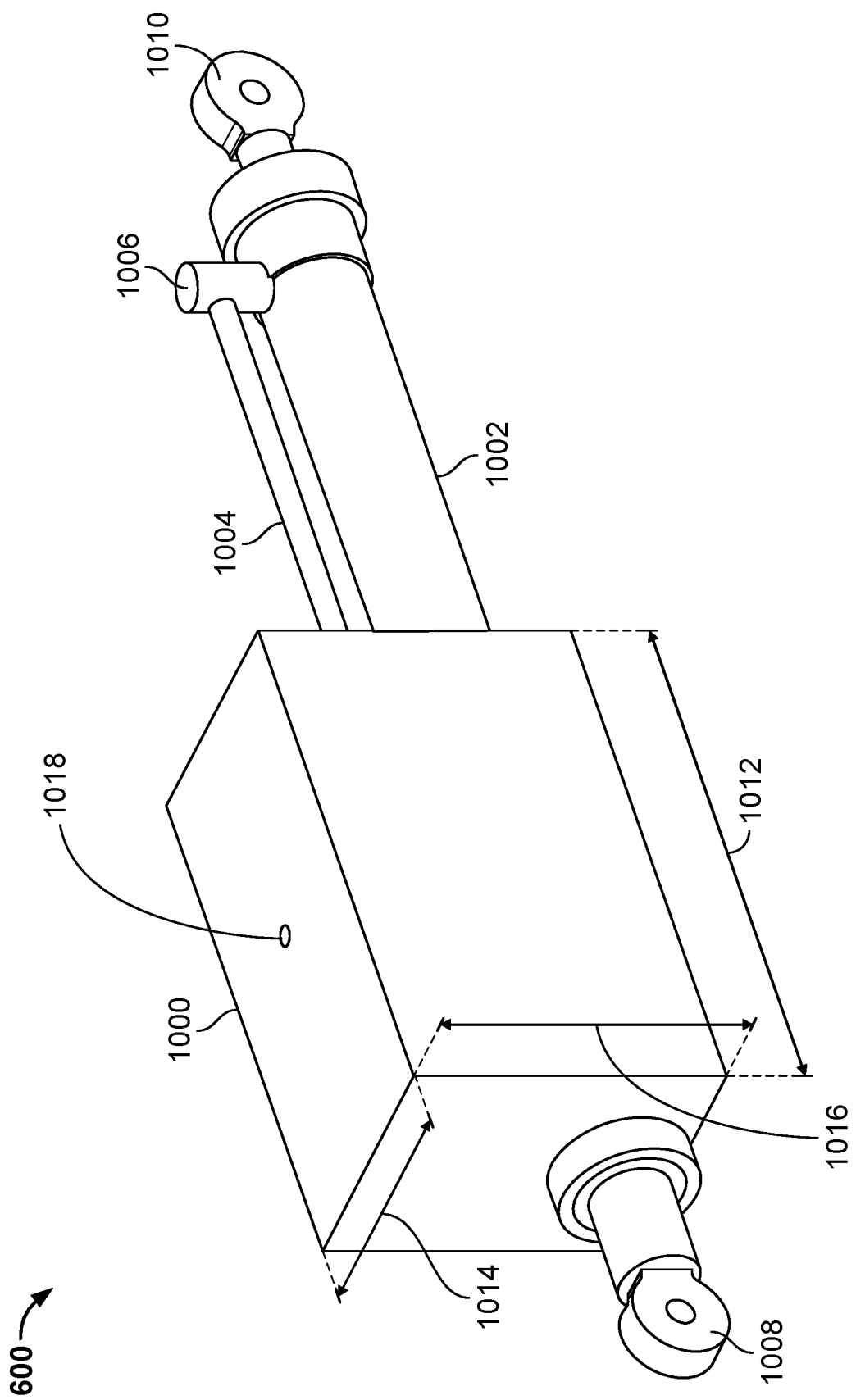
FIG. 10 is a perspective view of the example damper of FIGS. 6-9.

FIG. 10 is a perspective view of the example damper 600 of FIGS. 6-9. In the illustrated example, the damper 600 includes a housing 1000, a cylinder 1002, a tube 1004, a connector 1006, a first rod end 1008 and a second rod end 1010. In some examples, the first rod end 1008 is coupled to the wing 104 proximate a fixed portion of the flap actuation system 400 (e.g., the support bracket 402) via the first side support 602, and the second rod end 1010 is coupled to the second flap 114 proximate a movable portion (e.g., the flap link arm 404 and/or the moveable side support 406) of the flap actuation system 400 via the second side support 604. In some examples, the housing 1000 is coupled to the wing 104 proximate a fixed portion of the flap actuation system 400 (e.g., the support bracket 402) via the first side support 602, and the second rod end 1010 is coupled to the second flap 114 proximate a movable portion (e.g., the flap link arm 404 and/or the moveable side support 406) of the flap actuation system 400 via the second side support 604. In the illustrated example, the housing 1000 has a length 1012, a width 1014, and a height 1016. In some examples, the length 1012, the width 1014, and the height 1016 can be sized to dispose the damper 600 in a flap support fairing (e.g., the flap support fairing 200). In some examples, the length 1012, the width 1014, and the height 1016 can be sized based on an expected amount of aerodynamic flutter. That is, the housing 1000 can be sized based on a required amount of hydraulic fluid. In some examples, the housing 1000 can be sized based on a number of components (e.g., pipes, sensors, valves, etc.) that are to be disposed in the housing 1000. In the illustrated example, the tube 1004 is coupled (e.g., via welds) to the housing 1000 and to the connector 1006. In the illustrated example, the connector 1006 is coupled to the cylinder 1002. As such, the tube 1004 and the connector 1006 fluidly couple the housing 1000 to the cylinder 1002, as discussed in more detail below. In the illustrated example, the housing 1000 includes an inlet 1018 to receive hydraulic fluid from the aircraft 100 (e.g., a hydraulic fluid system of the aircraft 100).

Figure 11:
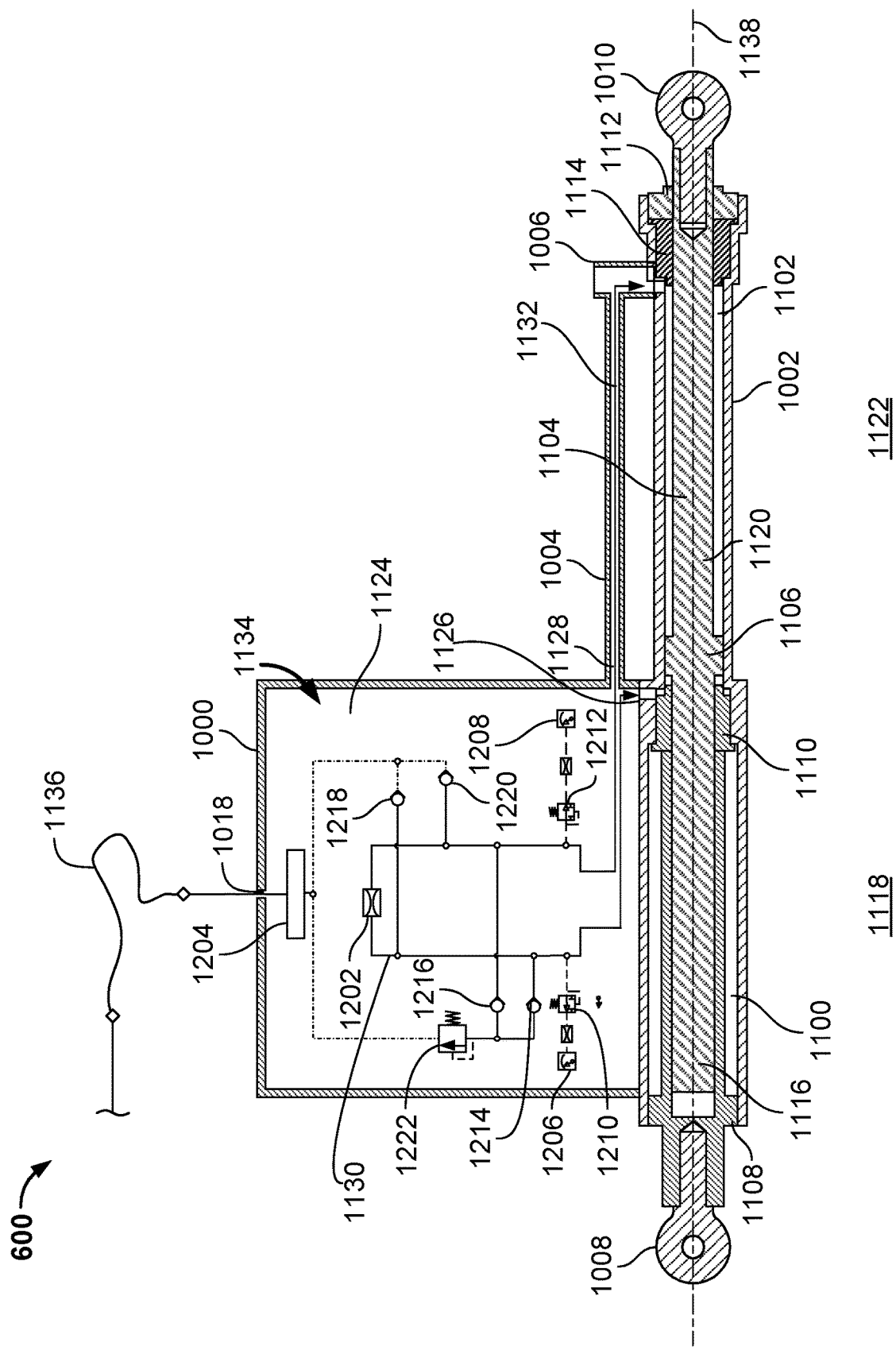
FIG. 11 is a cross-sectional view of the example damper of FIGS. 6-10.

FIG. 11 is a cross-sectional view of the example damper 600 of FIGS. 6-10. In the illustrated example, the damper 600 includes a first chamber 1100, a second chamber 1102, a rod 1104, a rod head 1106, a first gland retainer 1108, a first gland 1110, a second gland retainer 1112, and a second gland 1114. In the illustrated example, the rod 1104 (e.g., a piston rod) is coupled to the second rod end 1010. In the illustrated example, the cylinder 1002 includes the first chamber 1100 and the second chamber 1102. In the illustrated example, the rod 1104 includes a first portion 1116 positioned within the first gland retainer 1108 and the first chamber 1100 on a first side 1118 of the rod head 1106, and a second portion 1120 positioned within the second chamber 1102 on a second side 1122 of the rod head 1106 located opposite the first side 1118 of the rod head 1106. In the illustrated example, the housing 1000 includes a fluid chamber 1124, a first outlet 1126, and a second outlet 1128. In the illustrated example, the fluid chamber 1124 is to receive hydraulic fluid from the aircraft 100 (e.g., a hydraulic fluid system of the aircraft 100) via the inlet 1018. The fluid chamber 1124 of the illustrated example supplies hydraulic fluid to the second chamber 1102 (e.g., via an orifice) on the first side 1118 of the rod head 1106 via a first fluid supply line 1130 via the first outlet 1126. To supply hydraulic fluid to the second side 1122 of the rod head 1106 in the second chamber 1102, the fluid chamber 1124 includes the second outlet 1128, which couples a second fluid supply line 1132 to the second side 1122 of the rod head 1106 in the second chamber 1102 via the tube 1004 and the connector 1006. In the illustrated example, the fluid chamber 1124 is shown with example components 1134 coupled to the hydraulic system of the aircraft 100 via a third fluid supply line 1136. In the illustrated example, the first fluid supply line 1130, the second fluid supply line 1132, and the third fluid supply line 1136 are made of a flexible material to accommodate movement of the damper 600. In some examples, the first fluid supply line 1130, the second fluid supply line 1132, and the third fluid supply line 1136 are made of a rigid material. The components 1134 are described in more detail in connection with FIG. 12.

To damp movement of the second flap 114 if the flap actuation system 400 is inoperative, the rod head 1106 moves along a longitudinal axis 1138 of the cylinder 1002 to push hydraulic fluid through orifice 1202 to provide a damping force to the second flap 114. In some examples, the rod head 1106 moves along the longitudinal axis 1138 based on a pressurized hydraulic fluid that is supplied to the second chamber 1102 via the fluid chamber 1124. For example, when the second end 1010 is moved along the longitudinal axis 1138, hydraulic fluid may flow from the second chamber 1102 (e.g., via the orifice 1202) on the second side 1122 of the rod head 1106 through the second fluid supply line 1132 to the first side 1118 of the rod head 1106 through the first fluid supply line 1130 as the rod head 1106 moves toward the second gland 1114. In the illustrated example, the first gland 1110 and the second gland 1114 maintain a seal within the cylinder 1002. That is, the first and second glands 1110, 1114 maintain the hydraulic fluid within the cylinder 1002 (e.g., within the second chamber 1102). In some example, the rod head 1106 may include an orifice. That is, hydraulic fluid may flow from the first side 1118 of the rod head 1106 in the second chamber 1102 to the second side 1122 of the rod head 1106 in the second chamber 1102 through the rod head 1106 as the rod head 1106 moves along the longitudinal axis 1138.

Figure 12:
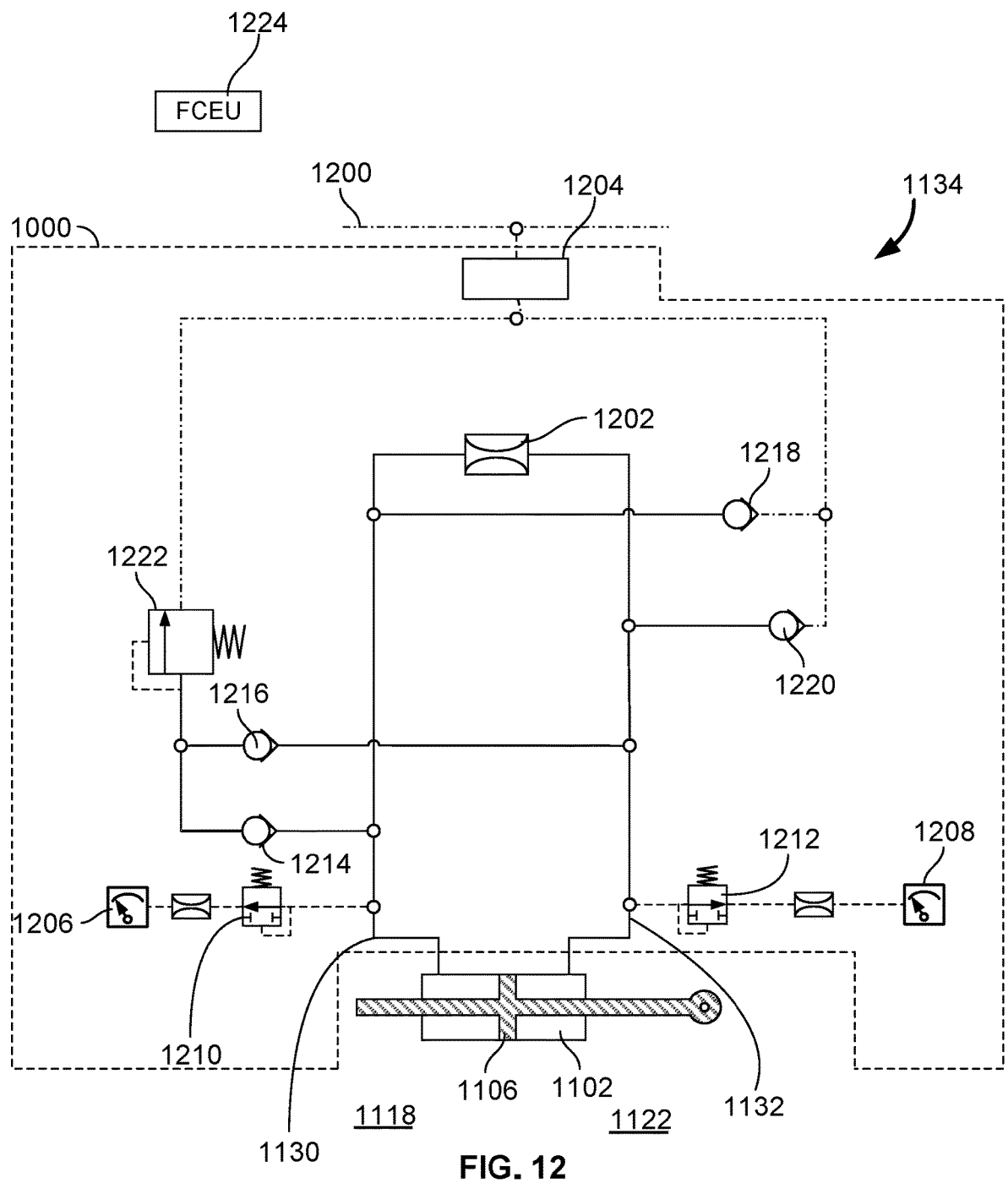
FIG. 12 is a schematic of the example damper of FIGS. 6-11 operatively coupled to an example hydraulic system of the example aircraft of FIG. 1.

FIG. 12 is a schematic of the example damper 600 of FIGS. 6-11 operatively coupled to an example hydraulic system 1200 of the example aircraft 100 of FIG. 1. FIG. 12 illustrates the components 1134 of the housing 1000 of FIGS. 10 and 11. In the illustrated example, the housing 1000 (e.g., the damper 600) includes an orifice 1202, a filter valve 1204, a first pressure transducer 1206, a second pressure transducer 1208, a first pressure limiter 1210, a second pressure limiter 1212, a first relief check valve 1214, a second relief check valve 1216, a first anti-cavitation valve 1218, a second anti-cavitation valve 1220, a load relief valve 1222, and a flight control electronics unit (FCEU) 1224. In other examples, the first pressure limiter 1210 and the second pressure limiter 1212 can be omitted from the housing 1000 and/or the damper 600. In the illustrated example, the filter valve 1204 filters the hydraulic fluid from the hydraulic system 1200 of the aircraft 100. For example, the filter valve 1204 filters debris from the hydraulic fluid prior to reaching the orifice 1202. In the illustrated example, the damper 600 is configured to produce a damping force having a magnitude that is based on a size of the orifice 1202 and a rate at which the hydraulic fluid is pushed through the orifice 1202. For example, the orifice 1202 may be sized based on an expected magnitude of aerodynamic flutter. In some examples, the orifice 1202 may have a diameter of approximately 0.01-0.2 inches. However, the orifice 1202 may have a diameter that is smaller or larger than the approximate range based on the expected magnitude of aerodynamic flutter. In some example, the orifice 1202 can be sized to provide an excessive damping force. That is, the orifice 1202 may be sized to overdamp (e.g., provide more damping force than necessary) based on an expected amount of aerodynamic flutter.

In the illustrated example, the first pressure transducer 1206, the first pressure limiter 1210, the first relief check valve 1214, and the first anti-cavitation valve 1218 are fluidly coupled to the first side 1118 of the rod head 1106 in the second chamber 1102, and the second pressure transducer 1208, the second pressure limiter 1212, the second relief check valve 1216, and the second anti-cavitation valve 1220 are fluidly coupled to the second side 1122 of the rod head 1106 in the second chamber 1102. The first and second pressure transducers 1206, 1208 monitor hydraulic fluid pressures of the second chamber 1102 of the damper 600. In some examples, the first and second pressure transducers 1206, 1208 generate an electrical signal based on the pressure measured at the orifice 1202 and/or within the second chamber 1102. In some examples, during normal aircraft operation, the first and second pressure transducers 1206, 1208 monitor pressures in the second chamber 1102 and output a signal to inform the flight crew that the damper 600 is not functioning properly. In some examples, the first and second relief check valves 1214, 1216 may open when the pressure within the second chamber 1102 exceeds the thresholds of the first and second pressure transducers 1206, 1208, and the first and second pressure limiters 1210, 1212. For example, the pressure within the second chamber 1102 may exceed a pressure threshold (e.g., a pressure at which the first pressure limiter 1210 is no longer able to limit the pressure) of the first pressure limiter 1210, and the first relief check valve 1214 may open and redirect the hydraulic fluid to the load relief valve 1222. The load relief valve 1222 of the illustrated example redirects the hydraulic fluid to the filter valve 1204 when the hydraulic fluid expands due to high temperatures and/or if the orifice 1202 is blocked by debris. The filter valve 1204 is configured to act as a bleed valve to relieve any excess pressure from the damper 600. In the illustrated example, the first and second anti-cavitation valves 1218, 1220 are configured to mitigate cavitation while the pressurized hydraulic fluid is being supplied to the second chambers 1102 of the damper 600. For example, the first anti-cavitation valve 1218 mitigates the formation of bubbles, and excessive noise and/or vibration resulting from supplying the damper 600 with the hydraulic fluid.

In the illustrated example, the FCEU 1224 is operatively coupled to (e.g. in communication with) the first pressure transducer 1206 and the second pressure transducer 1208. The FCEU 1224 may transmit and/or receive data from the first pressure transducer 1206 and the second pressure transducer 1208 to determine if the damper 600 is operating normally, if the damper 600 has malfunctioned, and/or if the damper 600 is actively mitigating aerodynamic flutter.

In some examples, the damper 600 is configured to be in a passive mode when the actuator 402 is moving the second flap 114. For example, the damper 600 provides minimal force (e.g., less than 20 pounds of resistive force) on the second flap 114 while the actuator 402 moves the second flap 114 between the deployed and retracted positions. In some examples, the damper 600 is configured to be in an active mode in response to a failure of the actuator 402. For example, when the actuator 402 fails, the second flap 114 may provide a threshold force to the second rod end 1010 activating the damper 600, thereby mitigating aerodynamic flutter.

As used herein, the term "passive mode" refers to a state of operation in which an actuator is operating normally (e.g., the actuator is actuating the flap) and a damper is providing a negligible resistive force (e.g., less than 20 pounds of resistive force) as hydraulic fluid passes through the orifice between the first side 1118 of the rod head 1106 in the second chamber 1102 and the second side 1122 of the rod head 1106 in the second chamber 1102. As used herein, the term "active mode" refers to a state of operation in which a damper is providing a damping force (e.g., greater than 20 pounds of resistive force) as hydraulic fluid passes through the orifice between the first side 1118 of the rod head 1106 in the second chamber 1102 and the second side 1122 of the rod head 1106 in the second chamber 1102 to mitigate aerodynamic flutter.

Figure 13:
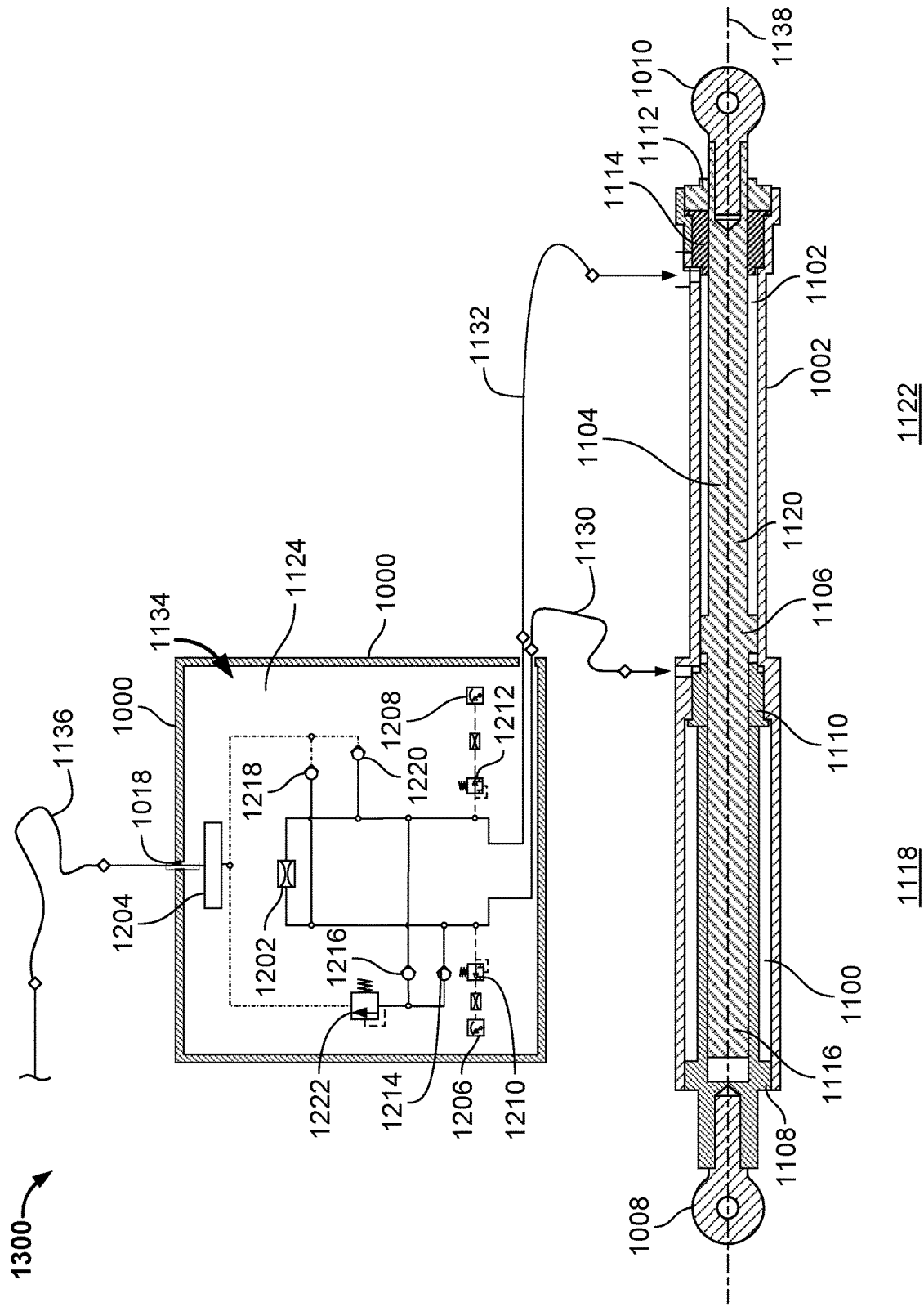
FIG. 13 is a cross-sectional view of another example damper that may be used with the examples disclosed herein.

FIG. 13 is a cross-sectional view of another example damper 1300 that may be used with the examples disclosed herein. In the illustrated example of FIG. 13, the damper 1300 operates in a similar manner as the damper 600 of FIG. 11. However, in contrast to the damper 600 of FIG. 11, the housing 1000 of the damper 1300 is separate from the cylinder 1002. That is, the housing 1000 of the damper 1300 may be coupled to a fixed wing portion of the aircraft 100 that is separate from the couplings of the first end 1008 and the second end 1010. In some example, the housing 1000 of the damper 1300 may be positioned at a location other than inside of the fairing (e.g., the fairing 200).

Figure 14:
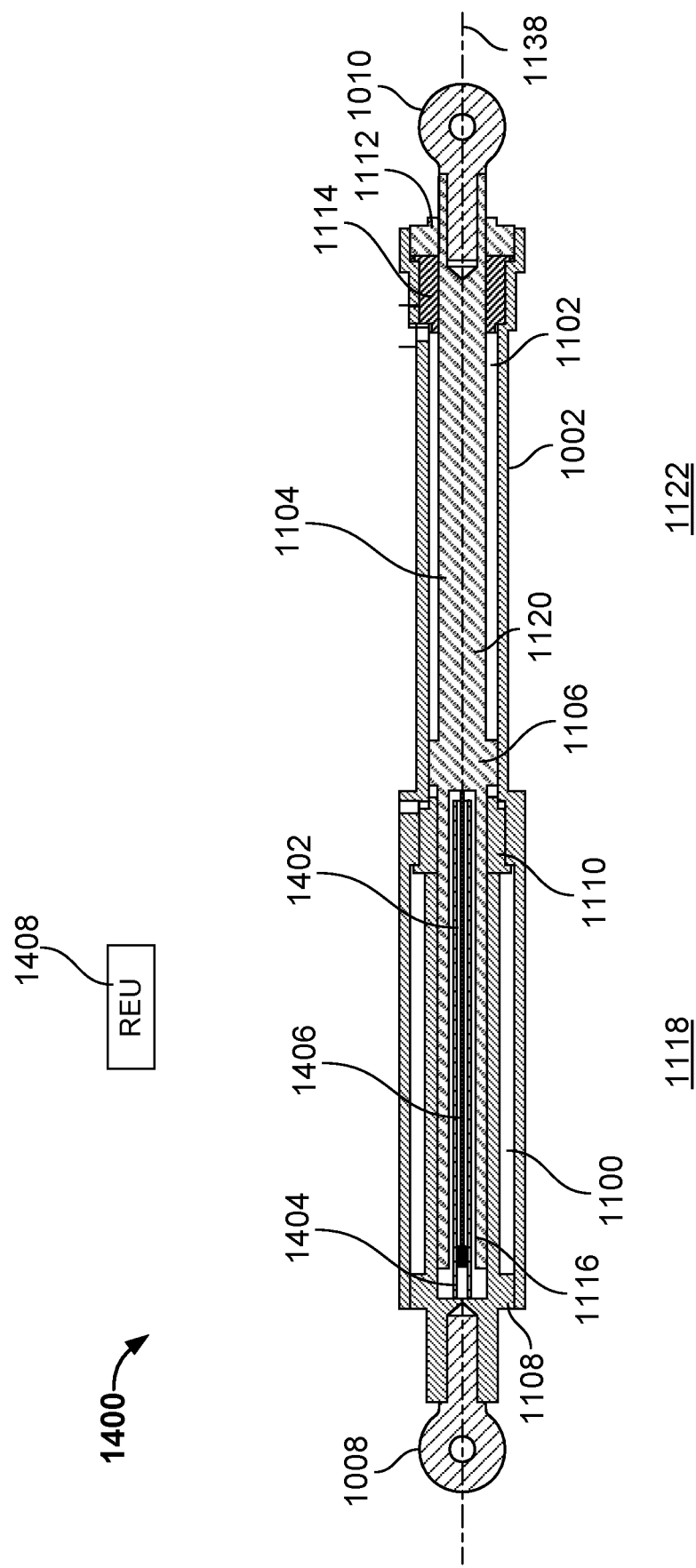
FIG. 14 is a cross-sectional view of another example damper that may be used with the examples disclosed herein.

FIG. 14 is a cross-sectional view of another example damper 1400 that may be used with the examples disclosed herein. In the illustrated example of FIG. 14, the damper 1400 operates in a similar manner as the damper 600 of FIG. 11 and the damper 1300 of FIG. 13. However, in contrast to the damper 600 of FIG. 11 and the damper 1300 of FIG. 13, the damper 1400 includes an example linear variable differential transducer (LVDT) 1402. The LVDT 1402 includes a body 1404 and a core 1406 that are located within the rod 1104 on the first side 1118 of the rod head 1106. In the illustrated example, the body 1404 is coupled to the first end 1008 and the core 1406 is coupled to the rod head 1106. As such, as the rod 1104 moves along the longitudinal axis 1138, the core 1406 moves within the body 1404 to measure displacement, for example. The LVDT 1402 senses, measures and/or detects a position (e.g., a retracted position, an extended position, etc.) of the rod 1104 of FIG. 14. In some example, the LVDT 1402 is operatively coupled to (e.g., in communication with) a remote electronics unit (REU) 1408 such that the REU 1408 may receive and/or obtain damper position feedback data sensed, measured and/or detected via the LVDT 1402. In the illustrated example, positioning the LVDT 1402 within the rod 1104 allows the REU 1408 and/or the FCEU 1224 to determine if the damper 1400 is actively damping the flap. Additionally, positioning the LVDT 1402 within the rod 1104 eliminates the need for external sensors that measure the position of a flap. As such, positioning the LVDT 1402 within the rod 1104 mitigates the need for external sensors, and the external sensors associated brackets and linkages, thereby reducing cost and weight.

Figure 15:
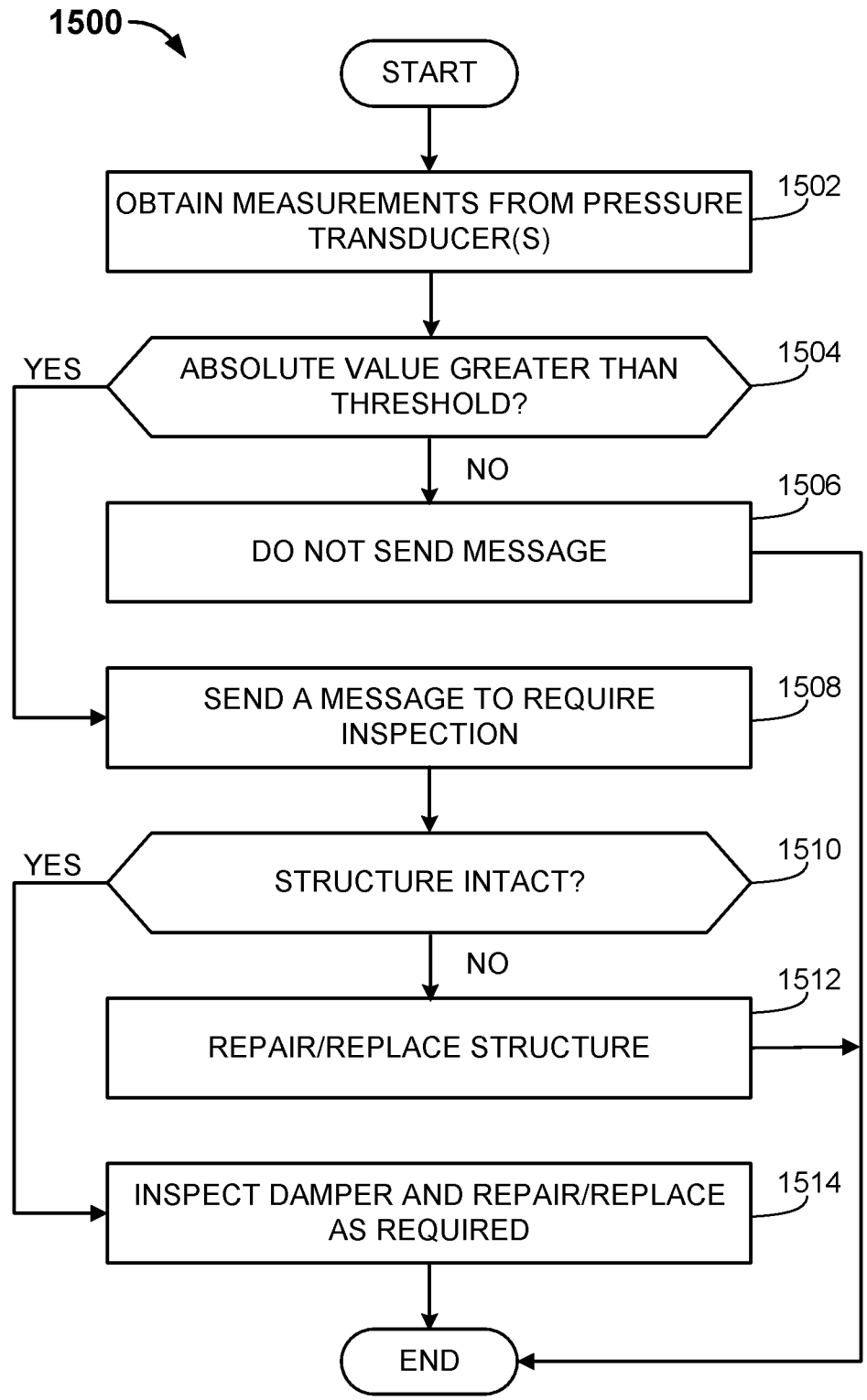
FIG. 15 is a flowchart representative of an example method for implementing the example dampers of FIGS. 11-14 during operation of the aircraft.

FIG. 15 is a flowchart representative of an example method 1500 for implementing the example damper(s) 600, 1300, 1400 during operation of the aircraft. The method 1500 begins with obtaining measurements from pressure transducers (block 1502). For example, the FCEU 1224 (or the REU 1408) obtains measurements from the first pressure transducer 1206 and the second pressure transducer 1208.

At block 1504, it is determined if the absolute value is greater than a threshold. For example, the FCEU 1224 determines if the absolute value of a pressure difference between (i) the pressure on the first side 1118 of the rod head 1106 in the second chamber 1102 and (ii) the pressure on the second side 1122 of the rod head 1106 in the second chamber 1102 is greater than a threshold. In some examples, the threshold is dependent upon the size of the orifice 1202 and the rate of flow of the hydraulic fluid. If the FCEU 1224 determines that the absolute value is not greater than the threshold, the method 1500 proceeds to block 1506 and the FCEU 1224 does not send a message. The method 1500 then ends.

If the FCEU 1224 determines that the absolute value is greater than the threshold, the method 1500 proceeds to block 1508 and the FCEU 1224 sends a message to require inspection. For example, the FCEU 1224 sends a message to require inspection of the actuator 402 and the damper 600 after landing.

At block 1510, the FCEU 1224 determines if the structure is intact. For example, the FCEU determines if the pressure difference was high because the damper 600 was mitigating aerodynamic flutter and moving at a faster rate than normal. If the FCEU 1224 determines that the structure is not intact, the method 1500 proceeds to block 1512 and the FCEU 1224 sends a message to repair/replace the structure (e.g., the damper, the actuator, etc.). The method 1500 then ends.

If the FCEU 1224 determines that the structure is intact, the method 1500 proceeds to block 1514 and the FCEU 1224 sends a message to inspect the damper and repair/replace as required. The method 1500 then ends.

From the foregoing, it will be appreciated that the above disclosed methods and apparatus mitigate aerodynamic flutter. Examples disclosed herein reduce cost, complexity, and weight associated with known flutter mitigation techniques, and are particularly advantageous for implementations in which the wings and/or the flaps of the aircraft are of a relatively thin construction. Examples disclosed herein avoid the need to increase the thickness of the wing and flap, thereby mitigating negative impacts on aircraft performance. Examples disclosed herein avoid the need to segment the trailing edge flap, thereby mitigating adding more weight (e.g., more flaps, more fairings, etc.) to the aircraft and reducing costs. Examples disclosed herein also avoid adding additional flap supports and actuators, thereby mitigating over constraining the motion of the flap to avoid high loads at the middle support of the wing. Additionally, the examples disclosed herein do not rigidly resist motion, thereby providing sufficient force to resist oscillating motion of the flap and reduce aerodynamic flutter.

In some examples, an apparatus is disclosed. In some disclosed examples, the apparatus comprises a fairing, an actuator, and a damper. In some disclosed examples, the fairing is located on a bottom side of a wing of an aircraft. In some disclosed examples, the actuator is disposed in the fairing. In some disclosed examples, the actuator is coupled to and extends between the wing and a flap of the wing. In some disclosed examples, the damper is disposed in the fairing. In some disclosed examples, the damper is coupled to and extends between the wing and the flap.

In some disclosed examples, the actuator is configured to move the flap between a retracted position and a deployed position relative to a fixed trailing edge of the wing. In some disclosed examples, the damper is configured to damp movement of the flap to mitigate aerodynamic flutter of the flap.

In some disclosed examples, the damper is configured to mitigate aerodynamic flutter of the flap in response to a failure of the actuator.

In some disclosed examples, the damper is configured to mitigate aerodynamic flutter of the flap when the flap is in the retracted position.

In some disclosed examples, wherein the damper includes a piston rod having a first end and a second end located opposite the first end. In some disclosed examples, the first end is coupled to the wing, and the second end is coupled to the flap.

In some disclosed examples, the first end of the piston rod is coupled to the wing proximate a fixed portion of the actuator. In some disclosed examples, the second end of the piston rod is coupled to the flap proximate a movable portion of the actuator.

In some disclosed examples, the damper includes a cylinder having a first chamber and a second chamber. In some disclosed examples, the piston rod includes a first portion positioned within the first chamber on a first side of a rod head of the piston rod, and a second portion positioned within the second chamber on a second side of the rod head located opposite the first side of the rod head.

In some disclosed examples, the rod head is movable along a longitudinal axis of the cylinder to provide a damping force to the flap. In some disclosed examples, the damper is configured to move along the longitudinal axis based on pressurized hydraulic fluid to be supplied to the damper.

In some disclosed examples, the damper includes an orifice configured to receive a pressurized hydraulic fluid. In some disclosed examples, the damper is configured to produce a damping force having a magnitude that is based on a size of the orifice.

In some disclosed examples, the apparatus further comprises a filter valve and a pressure transducer. In some disclosed examples the filter valve is coupled to a hydraulic system of the aircraft. In some disclosed examples, the filter valve is configured to provide pressurized hydraulic fluid to the damper. In some disclosed examples, the pressure transducer is configured to monitor hydraulic fluid pressures of the damper.

In some disclosed examples, the damper is configured to be in a passive mode when the actuator is moving the flap. In some disclosed examples, the damper is configured to be in an active mode in response to a failure of the actuator.

In some disclosed examples, the apparatus further comprises a load relief valve configured to relieve pressure from the damper.

In some disclosed examples, the apparatus further comprises an anti-cavitation valve configured to mitigate cavitation while the pressurized hydraulic fluid is being supplied to the damper.

In some examples, an aircraft is disclosed. In some disclosed examples, the aircraft comprises a wing, a fairing, an actuator, and a damper. In some disclosed examples, the wing has a fixed portion and a flap. In some disclosed examples, the flap is movable relative to the fixed portion. In some disclosed examples, the fairing is located on a bottom side of the wing. In some disclosed examples, the fairing extends between the fixed portion and the flap. In some disclosed examples, the actuator is disposed in the fairing. In some disclosed examples, the actuator is coupled to and extends between the fixed portion and the flap. In some disclosed examples, the damper is disposed in the fairing. In some disclosed examples, the damper is coupled to and extends between the fixed portion and the flap.

In some disclosed examples, the actuator is configured to move the flap between a retracted position and a deployed position relative to a fixed trailing edge of the wing. In some disclosed examples, the damper is configured to damp movement of the flap to mitigate aerodynamic flutter of the flap.

In some disclosed examples, the damper is configured to mitigate aerodynamic flutter of the flap in response to a failure of the actuator.

In some disclosed examples, the damper is configured to mitigate aerodynamic flutter of the flap when the flap is in the retracted position.

In some examples, a method is disclosed. In some disclosed examples, the method comprises moving a flap of a wing of an aircraft relative to a fixed portion of the wing between a retracted position and a deployed position. In some disclosed examples, the flap is moved via an actuator coupled to and extending between the fixed portion and the flap. In some disclosed examples, the actuator is disposed in a fairing located on a bottom side of the wing and extending between the fixed portion and the flap. In some disclosed examples, the method further comprises damping movement of the flap to mitigate aerodynamic flutter of the flap. In some disclosed examples, the movement of the flap is damped via a damper coupled to and extending between the fixed portion and the flap. In some disclosed examples, the damper is disposed in the fairing.

In some disclosed examples, the damping of the movement of the flap occurs in response to a failure of the actuator.

In some disclosed examples, the damping of the movement of the flap occurs when the flap is in the retracted position.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An apparatus, comprising:
   a fairing located on a bottom side of a wing of an aircraft;
   an actuator disposed in the fairing, the actuator coupled to and extending between the wing and a flap of the wing;
   a damper disposed in the fairing, the damper coupled to and extending between the wing and the flap, the damper including:
      a piston rod having a first end, a second end located opposite the first end, and a rod head located between the first end and the second end, the rod head having a first side and a second side located opposite the first side;
      a cylinder having a fluid chamber containing the rod head, the rod head separating the fluid chamber into a first portion including the first side of the rod head and a second portion including the second side of the rod head;
      a first fluid supply line in fluid communication with the first portion of the fluid chamber;
      a second fluid supply line in fluid communication with the second portion of the fluid chamber, the first and second fluid supply lines respectively configured to receive pressurized hydraulic fluid from a hydraulic system of the aircraft;
      a damping orifice operatively positioned between and in fluid communication with the first and second fluid supply lines;
      a first pressure transducer in fluid communication with the first fluid supply line, the first pressure transducer configured to monitor a first hydraulic pressure associated with the first portion of the fluid chamber; and
      a second pressure transducer in fluid communication with the second fluid supply line, the second pressure transducer configured to monitor a second hydraulic pressure associated with the second portion of the fluid chamber.

2. The apparatus of claim 1, wherein the rod head is movable along a longitudinal axis of the cylinder to provide a damping force to the flap, the rod head configured to move along the longitudinal axis based on pressurized hydraulic fluid to be supplied to the first portion of the fluid chamber via the first fluid supply line or to the second portion of the fluid chamber via the second fluid supply line.

3. The apparatus of claim 1, wherein the damper is configured to produce a damping force having a magnitude that is based on a size of the damping orifice.

4. The apparatus of claim 1, wherein the damper further includes a filter valve operatively positioned between and in fluid communication with the hydraulic system of the aircraft and respective ones of the first and second fluid supply lines, the filter valve configured to filter the pressurized hydraulic fluid provided by the hydraulic system of the aircraft to the first and second fluid supply lines.

5. The apparatus of claim 1, wherein the damper is configured to be in a passive mode when the actuator is moving the flap, and wherein the damper is configured to be in an active mode in response to a failure of the actuator.

6. The apparatus of claim 1, wherein the damper further includes a load relief valve configured to relieve pressure from the fluid chamber of the damper.

7. The apparatus of claim 1, further comprising wherein the damper further includes:

a first anti-cavitation valve operatively positioned between and in fluid communication with the hydraulic system of the aircraft and the first fluid supply line, the first anti-cavitation valve configured to mitigate cavitation while the pressurized hydraulic fluid is being supplied to the first fluid supply line; and a second anti-cavitation valve operatively positioned between and in fluid communication with the hydraulic system of the aircraft and the second fluid supply line, the second anti-cavitation valve configured to mitigate cavitation while the pressurized hydraulic fluid is being supplied to the second fluid supply line.

8. The apparatus of claim 1, wherein the first end of the piston rod is coupled to the wing, and the second end of the piston rod is coupled to the flap.

9. The apparatus of claim 8, wherein the first end of the piston rod is coupled to the wing proximate a fixed portion of the actuator, and the second end of the piston rod is coupled to the flap proximate a movable portion of the actuator.

10. The apparatus of claim 1, wherein the actuator is configured to move the flap between a retracted position and a deployed position relative to a fixed trailing edge of the wing, and the damper is configured to damp movement of the flap to mitigate aerodynamic flutter of the flap.

11. The apparatus of claim 10, wherein the damper is configured to mitigate aerodynamic flutter of the flap in response to a failure of the actuator.

12. The apparatus of claim 10, wherein the damper is configured to mitigate aerodynamic flutter of the flap when the flap is in the retracted position.

13. The apparatus of claim 1, further comprising a flight control electronics unit (FCEU) operatively coupled to the first and second pressure transducers, the FCEU configured to determine an operational status of the damper based on pressure data obtained from the first and second pressure transducers.

14. The apparatus of claim 13, wherein the FCEU is configured to:
 determine an absolute value of the difference between the first hydraulic pressure and the second hydraulic pressure;
 compare the absolute value of the difference to a threshold; and
 in response to the absolute value of the difference being greater than the threshold, generate a message indicating that inspection of the damper is required.

15. The apparatus of claim 13, wherein the operational status of the damper indicates that the damper is operating normally, that the damper has malfunctioned, or that the damper is actively mitigating aerodynamic flutter.

16. A method, comprising:
 moving a flap of a wing of an aircraft relative to a fixed portion of the wing between a retracted position and a deployed position, the flap being moved via an actuator coupled to and extending between the fixed portion and the flap, the actuator disposed in a fairing located on a bottom side of the wing and extending between the fixed portion and the flap; and
 damping movement of the flap to mitigate aerodynamic flutter of the flap, the movement of the flap being damped via a damper coupled to and extending between the fixed portion and the flap, the damper disposed in the fairing, the damper including:
  a piston rod having a first end, a second end located opposite the first end, and a rod head located between the first end and the second end, the rod head having a first side and a second side located opposite the first side;
  a cylinder having a fluid chamber containing the rod head, the rod head separating the fluid chamber into a first portion including the first side of the rod head and a second portion including the second side of the rod head;
  a first fluid supply line in fluid communication with the first portion of the fluid chamber;
  a second fluid supply line in fluid communication with the second portion of the fluid chamber, the first and second fluid supply lines respectively configured to receive pressurized hydraulic fluid from a hydraulic system of the aircraft;
  a damping orifice operatively positioned between and in fluid communication with the first and second fluid supply lines;
  a first pressure transducer in fluid communication with the first fluid supply line, the first pressure transducer configured to monitor a first hydraulic pressure associated with the first portion of the fluid chamber; and
  a second pressure transducer in fluid communication with the second fluid supply line, the second pressure transducer configured to monitor a second hydraulic pressure associated with the second portion of the fluid chamber.

17. The method of claim 16, wherein the damping of the movement of the flap occurs in response to a failure of the actuator.

18. The method of claim 16, wherein the damping of the movement of the flap occurs when the flap is in the retracted position.

19. The method of claim 16, further comprising:
 monitoring the first hydraulic pressure via the first pressure transducer;
 monitoring the second hydraulic pressure via the second pressure transducer; and
 determining, via a flight control electronics unit (FCEU) operatively coupled to the first and second pressure transducers, an operational status of the damper based on pressure data obtained from the first and second pressure transducers.

20. The method of claim 19, wherein determining the operational status of the damper includes:
 determining, via the FCEU, an absolute value of the difference between the first hydraulic pressure and the second hydraulic pressure;
 comparing, via the FCEU, the absolute value of the difference to a threshold; and
 in response to the absolute value of the difference being greater than the threshold, generating, via the FCEU, a message indicating that inspection of the damper is required.

21. The method of claim 19, wherein the operational status of the damper indicates that the damper is operating normally, that the damper has malfunctioned, or that the damper is actively mitigating aerodynamic flutter.

22. An apparatus, comprising:
 a fairing located on a bottom side of a wing of an aircraft;
 an actuator disposed in the fairing, the actuator coupled to and extending between the wing and a flap of the wing; and
 a damper coupled to and extending between the wing and the flap, the damper including:
  a piston rod disposed in the fairing, the piston rod having a first end, a second end located opposite the first end, and a rod head located between the first end and the second end, the rod head having a first side and a second side located opposite the first side;

a cylinder disposed in the fairing, the cylinder having a fluid chamber containing the rod head, the rod head separating the fluid chamber into a first portion including the first side of the rod head and a second portion including the second side of the rod head;

a first fluid supply line in fluid communication with the first portion of the fluid chamber;

a second fluid supply line in fluid communication with the second portion of the fluid chamber, the first and second fluid supply lines respectively configured to receive pressurized hydraulic fluid from a hydraulic system of the aircraft;

a damping orifice operatively positioned between and in fluid communication with the first and second fluid supply lines;

a first pressure transducer in fluid communication with the first fluid supply line, the first pressure transducer configured to monitor a first hydraulic pressure associated with the first portion of the fluid chamber; and a second pressure transducer in fluid communication with the second fluid supply line, the second pressure transducer configured to monitor a second hydraulic pressure associated with the second portion of the fluid chamber.

23. The apparatus of claim 22, further comprising a flight control electronics unit (FCEU) operatively coupled to the first and second pressure transducers, the FCEU configured to determine an operational status of the damper based on pressure data obtained from the first and second pressure transducers.

24. The apparatus of claim 23, wherein the FCEU is configured to:
   determine an absolute value of the difference between the first hydraulic pressure and the second hydraulic pressure;
   compare the absolute value of the difference to a threshold; and
   in response to the absolute value of the difference being greater than the threshold, generate a message indicating that inspection of the damper is required.

25. The apparatus of claim 23, wherein the operational status of the damper indicates that the damper is operating normally, that the damper has malfunctioned, or that the damper is actively mitigating aerodynamic flutter.

* * * * *

UNITED STATES PATENT AND TRADEMARK OFFICE
CERTIFICATE OF CORRECTION

PATENT NO. : 11,142,301 B2  
APPLICATION NO. : 16/552472  
DATED : October 12, 2021  
INVENTOR(S) : Good et al.

Page 1 of 1

It is certified that error appears in the above-identified patent and that said Letters Patent is hereby corrected as shown below:

In the Claims

Column 14, Line 66 (Claim 7): Delete "further comprising"

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*